(12) United States Patent
Pathan et al.

(10) Patent No.: US 8,213,388 B2
(45) Date of Patent: Jul. 3, 2012

(54) WIRELESS HAND-OVER IN MOBILE DEPLOYMENTS

(75) Inventors: Arnavkumar M. Pathan, Sunnyvale, CA (US); Gaetan Feige, l'Hay les Roses (FR); Johannes Petrus Kruys, Harmelen (NL)

(73) Assignee: Cisco Technology, Inc., San Jose, CA (US)

( * ) Notice: Subject to any disclaimer, the term of this patent is extended or adjusted under 35 U.S.C. 154(b) by 956 days.

(21) Appl. No.: 12/060,184

(22) Filed: Mar. 31, 2008

(65) Prior Publication Data

US 2009/0245199 A1  Oct. 1, 2009

(51) Int. Cl.
*H04W 36/08* (2009.01)
*H04W 36/28* (2009.01)
*H04W 36/30* (2009.01)

(52) U.S. Cl. ........ 370/332; 370/338; 455/437; 455/440; 455/443; 455/456.1

(58) Field of Classification Search .......... 370/328–332, 370/338; 455/436, 437, 439, 440, 442, 443, 455/456.1
See application file for complete search history.

(56) References Cited

U.S. PATENT DOCUMENTS

| | | | | |
|---|---|---|---|---|
| 5,924,033 | A * | 7/1999 | Carlsson et al. | 455/436 |
| 6,125,278 | A * | 9/2000 | Wieczorek et al. | 455/437 |
| 6,285,883 | B1 * | 9/2001 | Bringby et al. | 455/437 |
| 6,711,408 | B1 * | 3/2004 | Raith | 455/440 |
| 2003/0235165 | A1 * | 12/2003 | Wang | 370/331 |
| 2005/0096050 | A1 * | 5/2005 | Hidaka | 455/436 |
| 2005/0174974 | A1 * | 8/2005 | Sonntag et al. | 370/338 |
| 2006/0227744 | A1 * | 10/2006 | Metke et al. | 370/331 |
| 2006/0229070 | A1 * | 10/2006 | de La Chapelle et al. | 455/431 |
| 2007/0142050 | A1 * | 6/2007 | Handforth et al. | 455/436 |
| 2007/0184831 | A1 * | 8/2007 | Morimoto | 455/432.1 |
| 2007/0232311 | A1 * | 10/2007 | Kuhn et al. | 455/436 |

FOREIGN PATENT DOCUMENTS

EP  0630118  12/1994

* cited by examiner

*Primary Examiner* — Chi Pham
*Assistant Examiner* — Ahmed Elallam
(74) *Attorney, Agent, or Firm* — Stolowitz Ford Cowger LLP

(57) ABSTRACT

The network communication system includes a wireless interface to exchange wireless signals during at least one network connection, and a handover controller that uses a route profile identifying access points distributed over a given route or region that are capable of supporting the network connection, and to handover the network connection between access points as the device travels along the given route or through a region according to the route profile.

16 Claims, 5 Drawing Sheets

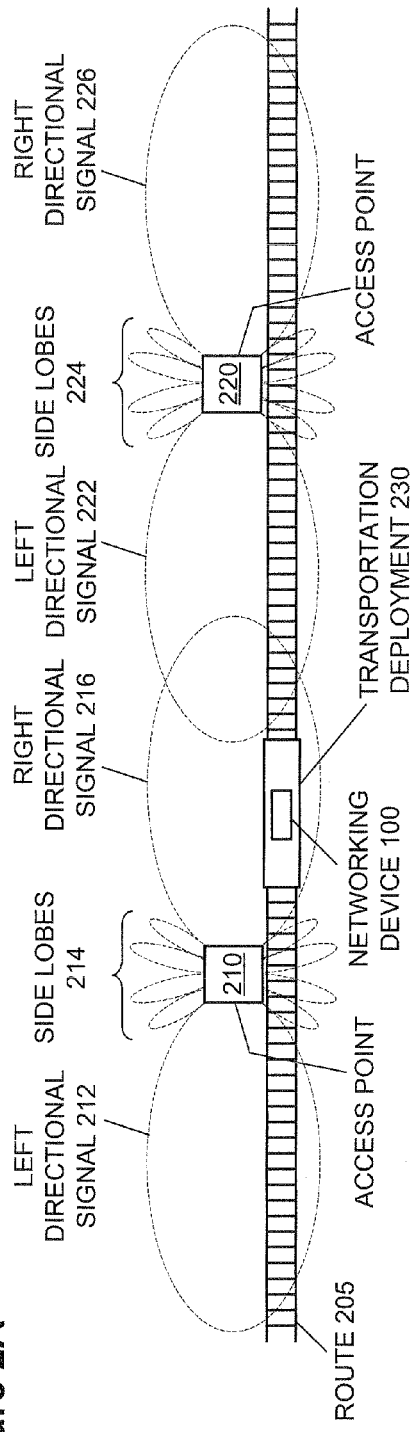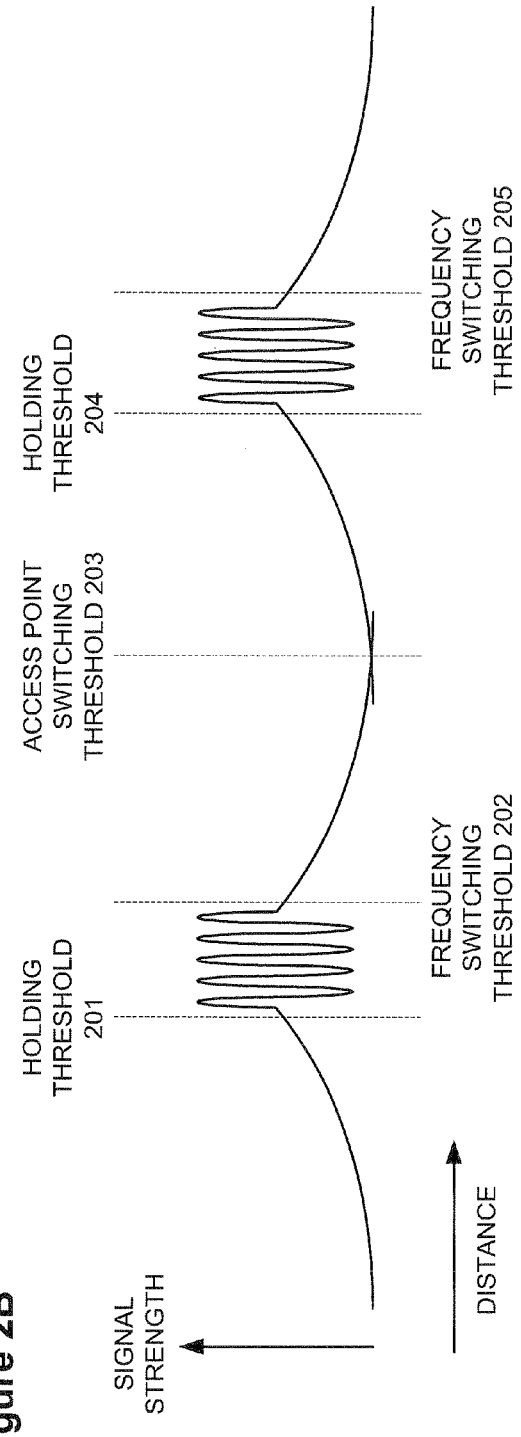

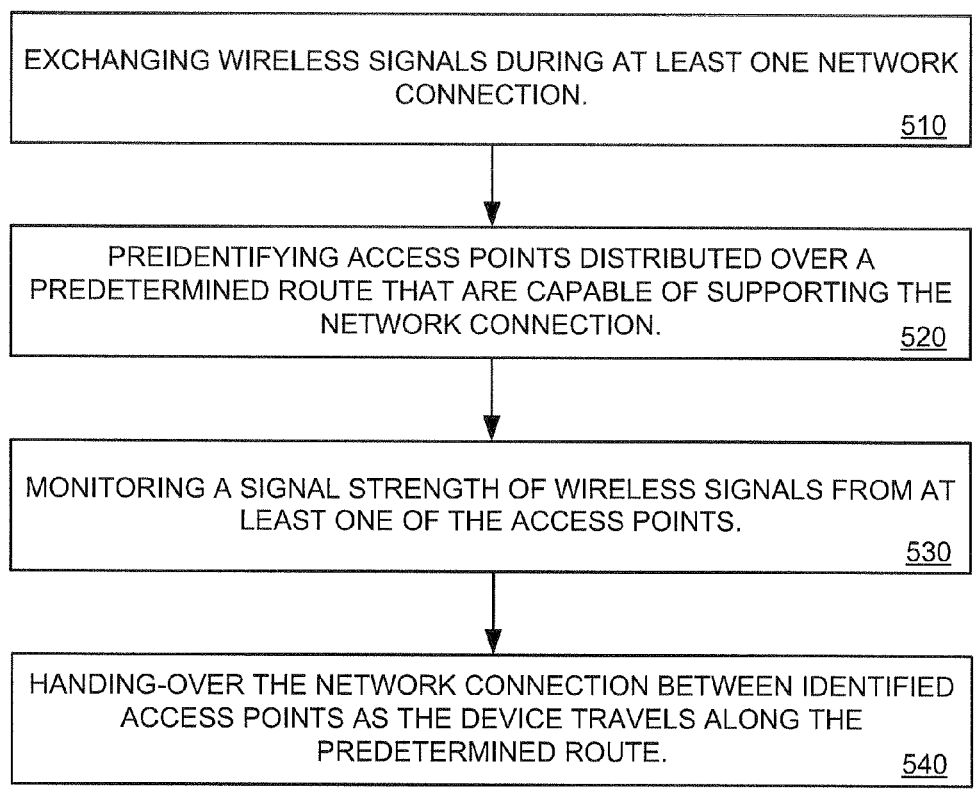

WIRELESS HAND-OVER IN MOBILE DEPLOYMENTS

FIELD OF THE INVENTION

This invention relates generally to network communications.

BACKGROUND

Wireless networking is becoming ubiquitous with an ever-increasing number of offices, homes, and public facilities allowing users to communicate with access points over wireless local area networks (WLAN), e.g., according to an 802.11 standard or other wireless applications. This ability to communicate wirelessly grants users the freedom to move around their local environments while communicating through their wireless devices. When users wander outside of range of their access point, however, their connection degrades and may be dropped, unless the wireless devices react to the changing environment by locating another access point in-range that can support the connection.

Many wireless devices include hand-over functionality that attempts to switch access points when users travel out-of-range. In transportation deployments, such as on trains, cars, and buses, wireless devices are typically required to switch access points or wireless frequencies fairly often to maintain a connection. Since this hand-over functionality is reactive in nature, rapid environment changes with high signal-level fluctuations, such as in the transportation deployments, cause wireless devices to unpredictably drop association to access points, often making a re-association with the dropped access points difficult.

DESCRIPTION OF THE DRAWINGS

FIG. 2A illustrates an example system implementing mobile wireless hand-over.

FIG. 2B shows an example diagram of route-based signal strength for mobile wireless hand-over implementation shown in FIG. 2A.

FIG. 5 shows an example method for mobile wireless hand-over.

DETAILED DESCRIPTION

Overview

In network communications, a system includes a wireless interface to exchange wireless signals during at least one network connection, and a handover controller to generate a route profile identifying access points distributed over a predetermined route or region that are capable of supporting the network connection, and to handover the network connection between access points as the device travels through a given region, possibly along the predetermined route according to the route profile. Embodiments will be described below in greater detail.

DESCRIPTION

Figure 1:
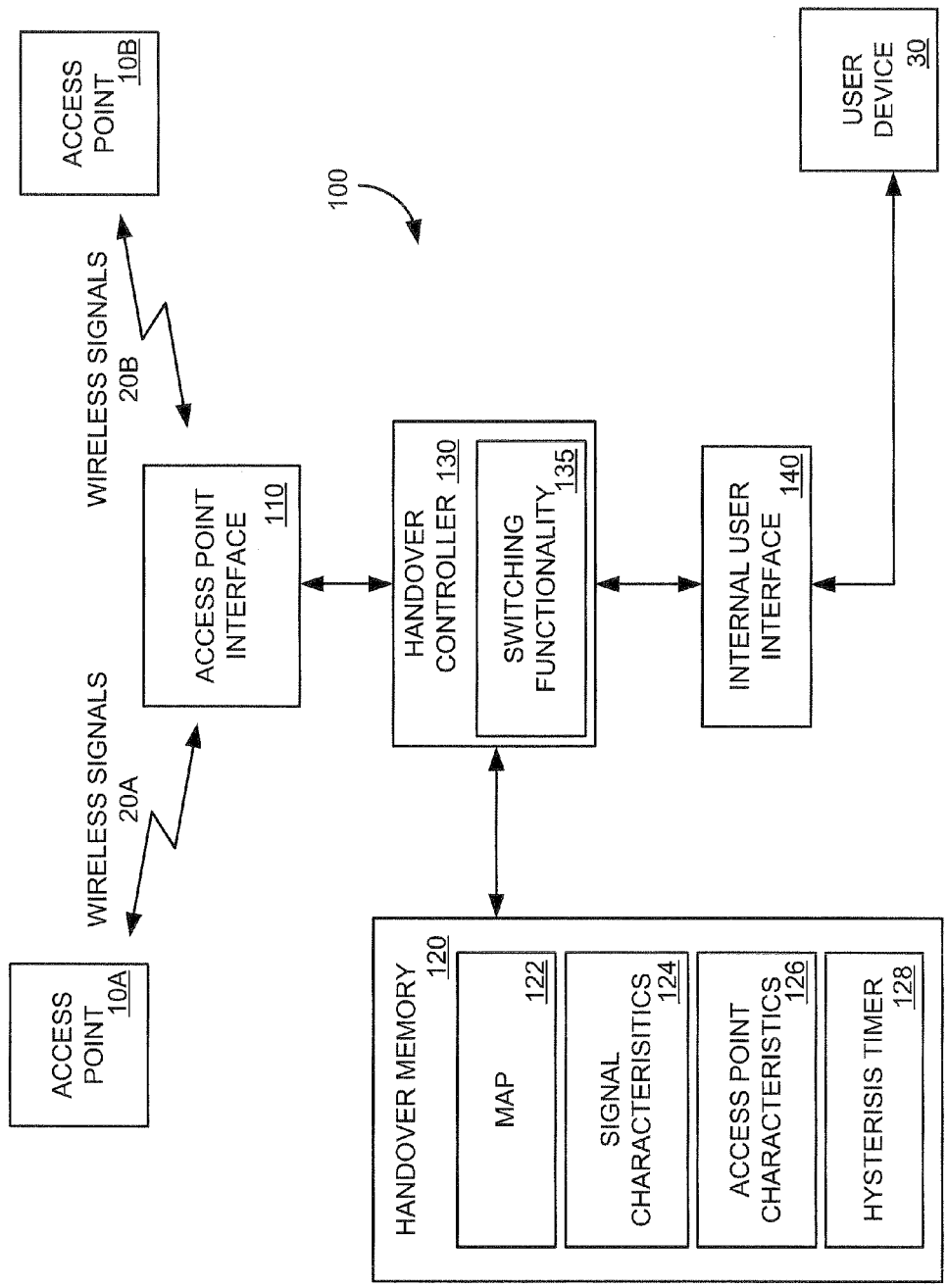
FIG. 1 illustrates an example device implementing mobile wireless hand-over.

FIG. 1 illustrates an example networking device 100 implementing mobile wireless hand-over. Referring to FIG. 1, the networking device 100 is configured to associate with at least one access point 10A or 10B when establishing and/or supporting one or more network connections for a user device 30. The networking device 100 may proactively handover the network connections between access points or switch wireless frequencies associated with an access point. For instance, in mobile deployments, the networking device 100 may pre-identify access points capable of supporting the network connections, so the networking device 100 may drop and initiate association with the identified access points when traveling down a path or along a route.

The networking device 100 includes an access point interface 110 to exchange wireless signals 20A and 20B with access points 10A and 10B, respectively, to establish or support the network connections for user device 30. The access points 10A and 10B may be wireless points of access to at least one communication network (not shown), such as the Internet. Although FIG. 1 shows only two access points 10A and 10B, in some embodiments the networking device 100 may communicate or identify with any number of access points.

The access point interface 110 may communicate with the access points 10A and 10B over one or more wireless connections e.g., according to an 802.11 standard or other wireless applications. Each access point 10A and 10B may exchange wireless signals 20A and 20B, respectively, in specific wireless frequencies or channels. The access point interface 110 may include an antenna to receive wireless signals 20A and 20B, such as a directional antenna or an omni-directional antenna, or any other device capable of receiving wireless signals 20A and 20B from the access points 10A and 10B, respectively.

The access point interface 110 is configured to convert the wireless signals 20A and 20B received from the access points 10A and 10B, respectively, into electrical signals and provide them to a handover controller 130. The handover controller 130 may control the operation of the networking device 100, and direct the establishment or support of network connections through at least one of the access points 10A and 10B.

The handover controller 130 includes switching functionality 135 to determine when to handover the network connections between access points 10A and 10B or switch wireless frequencies (or channel) associated with the access points 10A and 10B. The switching functionality 135 may make this determination based, at least in part, on prior knowledge of one or more of the location of the access points 10A and 10B, the route of the networking device 100, the expected characteristics of the wireless signals 20A and 20B given the location of the networking device 100, or characteristics of the access points 10A and 10B.

The networking device 100 includes a handover memory 120 to store information related to handover between access points. This information may be provided to the networking device 100 during initial configuration, dynamically from one or more of the access points 10A and 10B, or from a third-party link or device (not shown). The third party link may also provide information, such as speed or location, to the networking device 100 from the transportation deployment or a positioning device, e.g., a global positioning system or the like.

The handover memory 120 includes a map 122 that defines locations of access points 10A and 10B in a geographical region or along a predetermined route. The handover controller 130 may introduce the location of the networking device 100 in the geographical region or along the predetermined route into the map 122 once provided to or derived by the networking device 100. The map 122 may also specify where environmental interference is present in the geographical region or along the predetermined route, and the effect of the environmental interference on the wireless signals 20A and 20B. Environmental interference may include other access points not available for use by the networking device 100, or other interference in the frequency band utilized by nearby access points 10A or 10B.

The handover memory 120 includes signal characteristics 124 related to the access points 10A and 10B. The signal characteristics 124 may include a measured or received strength of the wireless signals 20A and 20B at various locations in the geographical region or along the predetermined route. The signal characteristics 124 may also include threshold signal strength levels that indicate when to handover access points or invoke a hysteresis timer 128 responsive to actual signal strength characteristics. The signal characteristics 124 may include a rate of signal strength over time for at least one location on the geographical region or along the predetermined route.

The handover memory 120 includes access point characteristics 126, such as the channel or wireless frequency utilized by the access points 10A and 10B, and/or the type of antenna associated with the access points 10A and 10B. In some wireless signaling applications, wireless communication devices, such as networking device 100, communicate in channels corresponding to particular ranges of wireless frequencies. The networking device 100 may have a directional antenna, an omni-directional antenna, or any other device capable of sending and/or receiving wireless signals with access points 10A and 10B.

The handover memory 120 includes a hysteresis timer 128 that, once invoked, may direct the handover controller 130 to not, or at least resist, handing-over the network connections. The hysteresis timer 128 may be invoked during periods that have high-levels of signal strength fluctuations, such as when the networking device 100 is close to the access points 10A and 10B. In some embodiments, the hysteresis timer 128 may be invoked responsive to measured signal strengths that rise above a predetermined threshold and thus indicate to the handover controller 130 that the networking device 100 is close to an access point 10A or 10B. The handover controller 130 may also utilize knowledge of the networking device's 100 location relative to available access points 10A and 10B to determine whether to invoke the hysteresis timer 128.

The handover controller 130, or the switching functionality 135, may generate or derive at least one route profile for the networking device 100. In some embodiments, the route profile may describe one or more of the predetermined route of the networking device 100, the location of available access points along the predetermined route, the location of the networking device 100 along the predetermined route, the expected signal characteristics of the access points relative to the location of the networking device 100, the signaling characteristics of the access points, and an indication of when to handover the network connections between access points or to ignore the signaling of the access points. In other embodiments, the route profile may describe one or more of a geographical region, the location of available access points in the geographical region, the location of the networking device 100 in the geographical region, the expected signal characteristics of the access points relative to the location of the networking device 100 in the geographical region, the signaling characteristics of the access points, and an indication of when to handover the network connections between access points or to ignore the signaling of the access points.

The networking device 100 includes an internal user interface 140 to enable one or more user devices 30 communicate through the access points 10A and 10B. For example, the handover controller 130 may receive communication from the user device 30 through the internal user interface 140, and then forward the communication to the access points 10A and 10B via the access point interface 110.

FIG. 2A illustrates an example system implementing mobile wireless hand-over. Referring to FIG. 2A, the system includes a transportation deployment 230 to travel along a route 205. In some embodiments, the route 205 may be fixed or predefined, such as track, waterway, or other type of conduit that dictates the path of the transportation deployment 230.

The transportation deployment 230 includes a networking device 100 to exchange wireless signals with access points 210 and 220 and support network connections of user devices (not shown) on the transportation deployment 230 while traveling down the route 205. The access points 210 and 220 are shown in FIG. 2A as having directional transceiving capability allowing the access points 210 and 220 to exchange wireless signals along the route 205. For instance, access point 210 has a left directional signal 212 and a right directional signal 216, generally aimed along the route 205. Access point 220 similarly has a left directional signal 222 and a right directional signal 226, generally aimed along the route 205. Each access point 210 and 220 has emission side lobes 214 and 224, respectively, that occur as a result of the use of directional antennas to generate the directional signals 212, 216, 222, and 226.

As the transportation deployment 230 travels along the route 205, for instance, from left-to-right, the networking device 100 may drop an association with the access point 210 and initiate an association with access point 220 in order to maintain any network connections. The networking device 100 also includes a hysteresis timer as described above that allows the networking device 100 to ignore an urge to handover the network connection until after passing the side lobes 214 and 224.

FIG. 2B shows an example diagram of route-based signal strength for mobile wireless hand-over implementation shown in FIG. 2A. Referring to FIG. 2B, the diagram shows example signal strength of wireless signals received by the networking device 100 as it passes by the access points 210 and 220 along the route 205. As the networking device 100 approaches the access point 210, for example, from left-to-right, the signal strength of left directional signal 212 rises until it reaches a holding threshold 201.

When the signal strength exceeds the holding threshold 201, the networking device 100 may invoke a hysteresis timer that allows the networking device 100 to ignore signal strength fluctuations associated with the side lobes 214 that may cause the networking device 100 to attempt to handover the network connections to the right directional signal 216. In some embodiments, the networking device 100 may invoke the hysteresis timer 128 according to the location of the networking device 100 relative to the access point 210, as determined from a route map or rote profile in the networking device 100.

The invocation of the hysteresis timer may cease after a predetermined period of time has elapsed, once the signal strength fluctuations cease to be as erratic as during the side lobes 214, or based upon the location of the networking device 100 relative to the access point 210.

Once the hysteresis timer has ceased to be invoked, the networking device 100 may perform frequency switching 202. For example, the networking device 100 may switch exchanging data with the access point 210 over the left directional signal 212 and initiate exchanging data over the right directional signal 216 during frequency switching 202. Since the left directional signal 212 and the right directional signal 216 may utilize different wireless channels or frequencies to transmit data, the network device 100 changes the channel or frequency that it exchanges data with the access point 210 during frequency switching 202. When the left directional signal 212 and the right directional signal 216 may utilize the same wireless channels or frequencies to transmit data, the network device 100 may determine to not switch the channel or frequency that it exchanges data with the access point 210 during frequency switching 202. The networking device 100 may include access point characteristics 126 to indicate which frequencies or channels the access point 210 utilizes for left directional signals 212 and right directional signal 216.

As the transportation deployment 230 continues to travel along the route 205, the signal strength of the right directional signal 216 weakens, and the networking device 100 begins to receive a left directional signal 222 from access point 220. The networking device 100 may include a map 122 to indicate which access point, i.e., 220, it is expecting to pick-up next as it travels along the route 205. The networking device 100 may approximate when it should begin receiving signaling from access point 220, e.g., at a certain location or a particular time, and which channel or frequencies the access point 220 will be utilizing.

Figure 3A:
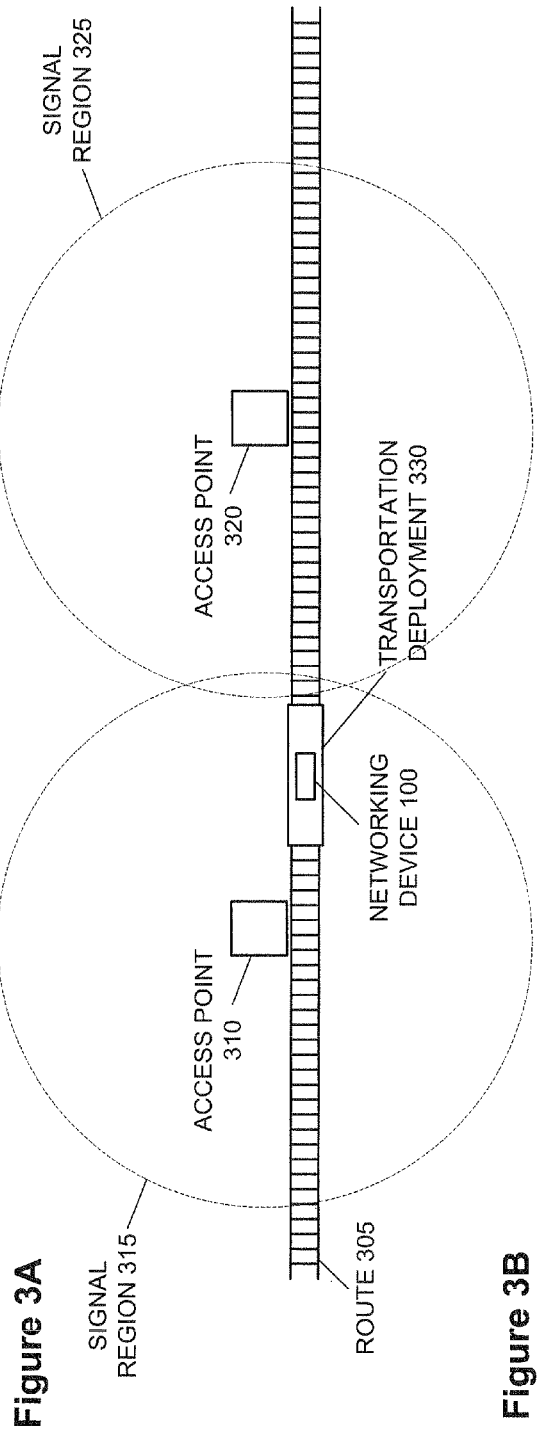
FIG. 3A illustrates an example system implementing mobile wireless hand-over.

FIG. 3A illustrates another example system implementing mobile wireless hand-over. Referring to FIG. 3A, this system is similar to the system described above with respect to FIGS. 2A and 2B with the following differences. The system includes access points 310 and 320 that exchange wireless signals omni-directionally. This may eliminate the side lobes 214 and 224 generated by the directional antennas used in access points 210 and 220 shown in FIGS. 2A and 2B. As such, the networking device 100 may not have to invoke hysteresis timers 128 when it is near the access points 310 and 320 or switch frequencies or channels as it passes by the access points 310 and 320.

The system includes a transportation deployment 330 to travel along a route 305. In some embodiments, the route 305 may be fixed or predefined, such as track, waterway, or other type of conduit that dictates the path of the transportation deployment 330. The transportation deployment 330 includes a networking device 100 to exchange wireless signals with access points 310 and 320 and support network connections of user devices (not shown) on the transportation deployment 330 while traveling down the route 305.

As the transportation deployment 330 travels along the route 305, for instance, from left-to-right, the networking device 100 may drop an association with the access point 310 and initiate an association with access point 320 in order to maintain any network connections. In some embodiments, the networking device 100 may pre-identify the access points 310 and 320 as available to support network connections, and may pre-identify characteristics of the access points 310 and 320, such as the type of antenna utilized by the access points 310 and 320.

Figure 3B:
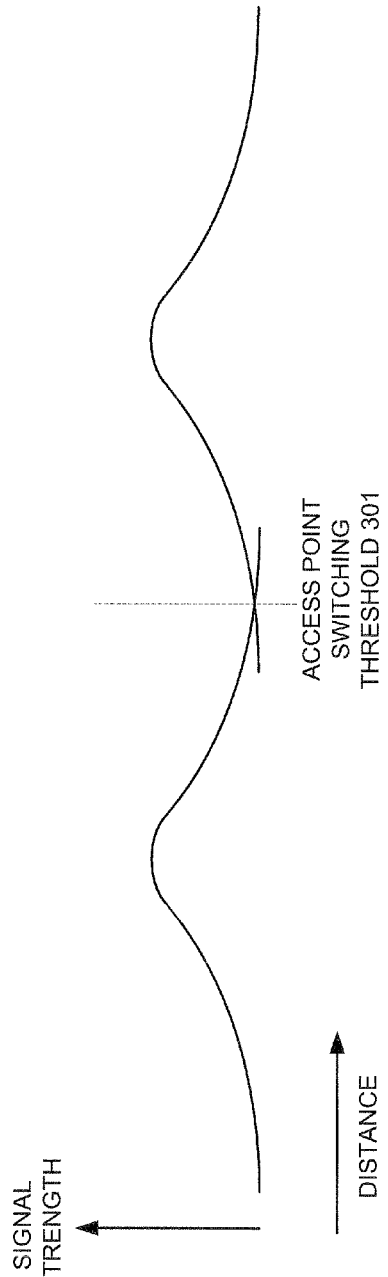
FIG. 3B shows an example diagram of route-based signal strength for mobile wireless hand-over implementation shown in FIG. 3A.

FIG. 3B shows an example diagram of route-based signal strength for mobile wireless hand-over implementation shown in FIG. 3A. Referring to FIG. 3B, the diagram shows example signal strength of wireless signals received by the networking device 100 as it passes by the access points 310 and 320 along the route 305. The networking device 100 may pre-identify the characteristics of the access points 310 and 320, for example, that the access points 310 and 320 exchange wireless signals with an omni-directional antenna in a certain wireless frequency band or range.

As the networking device 100 approaches the access point 310, for example, from left-to-right, the signal strength of signal region 315 rises. The networking device 100 may include some pre-knowledge of the access point 310 and 320, such as the type of antenna utilized. Thus, the networking device 100 may utilize the pre-knowledge to determine that there is no need to switch wireless frequencies with access point 310 or to invoke a hysteresis timer 128, as there are no side lobes present with omni-directional antennas.

As the transportation deployment 330 continues to travel along the route 305, the signal strength of the signal region 315 weakens, and the networking device 100 begins to enter signal region 325 associated with access point 320. The networking device 100 may include a map 122 to indicate which access point, i.e., 320, it is expecting to associate with next as it travels along the route 305. The networking device 100 may approximate when it should begin receiving signaling from access point 320, e.g., at a certain location or a particular time, and which channel or frequencies the access point 320 will be utilizing.

The networking device 100 may proactively handover network connections between access points 310 and 320, for example, at access point switching threshold 301, according to the map 122 or other pre-knowledge included in networking device 100. In some embodiments, the handover may be made responsive to the signal level associated with signal region 315 dropping below a preset threshold, or the location of the transportation deployment relative to the access point 320.

Figure 4:
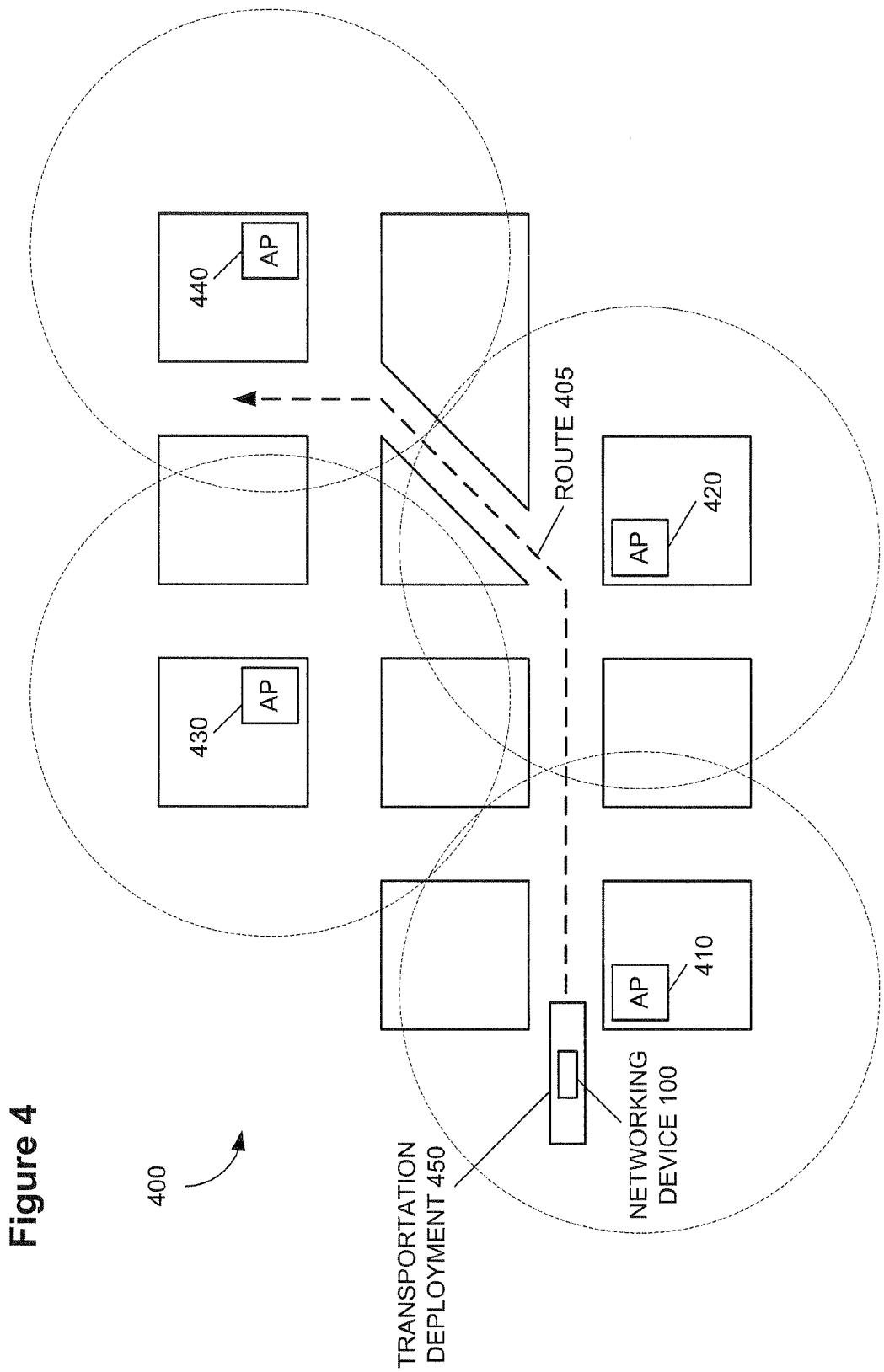
FIG. 4 illustrates another example system implementing mobile wireless hand-over.

FIG. 4 illustrates another example system implementing mobile wireless hand-over. Referring to FIG. 4, the system includes a transportation deployment 450 to travel along a non-predetermined route within a geographical region. In this embodiment, the transportation deployment 450 may travel along route 405, which may be roadways, or other areas that allow the operator of the transportation deployment 450 to dynamically determine a path to its ultimate destination.

The transportation deployment 450 includes a networking device 100 to exchange wireless signals with one or more access points 410-440 and support network connections of user devices (not shown) on the transportation deployment 450 while traveling down the route 405. The access points 410-440 are shown in FIG. 4 as having omni-directional transceiving capability allowing the access points 410-440 to exchange wireless signals along the route 405.

The networking device 100 may locate the access points 410-440 within the geographical region that can support network connections. These access points 410-440 may be located according to a map 122 or other pre-knowledge of the geographical region. For instance, as the transportation deployment 450 travels along the route 405, the networking device 100 may drop an association with the access point 410 and initiate an association with access point 420 in order to maintain any network connections. The networking device 100 may switch between access points 410 and 420 based upon location of the transportation deployment 450 relative to the access points 410 and 420, based on signal strength measurements from the access points 410 and 420, and/or based on the direction the transportation deployment 450 is traveling.

If the transportation deployment 450 took a left turn before reaching a signal region associated with access point 420, the networking device 100 may switch to access point 430 instead of access point 420 based on the pre-knowledge of the access point 430.

In some embodiments, the transportation deployment 450 may include a navigation system that suggests a route, e.g., route 405, through the geographical region. The navigation system may provide the suggested route to the networking device 100, allowing the networking device 100 to plan a route profile for the suggested route, including the location and characteristics of the access points 410-440 along the suggested route, the characteristics of the signals along the suggested route, and/or an indication on when to switch between access points.

In some instances, the networking device 100 may have multiple access points that each can support network connections for the networking device 100 to select from. The networking device 100 may select the access point that has the best signal strength, the access point that has fewer routing hops to a network backbone, the access point that is supporting few clients or other users, and/or the access point that has a lower transmitter load. The networking device 100 may also select access points to limit handover between access points. For instance, the networking device 100 may attempt to not handover the network connections when there is a strong probability that the connections will be handed-back in a short period of time later, or if another lower switching option is available.

In some embodiments, the networking device 100 may indicate to the navigation system whether the suggested route will have enough access points to maintain a substantially continuous network connection. The navigation system may provide alternative routes to the networking device 100 to determine whether they have enough access points to maintain a substantially continuous network connection. The navigation system may provide route options to the operator of the transportation deployment 450 based on continuity of network connections via the networking device 100, or the optimal routes to take to maximize the network connections supported by the networking device 100.

Although not shown in FIG. 4, some embodiments may include access points with directional antennas, and thus take into consideration frequency or channel switching, as well as hysteresis timers when determining a better route or access point.

FIG. 5 shows an example method for mobile wireless handover. Referring to FIG. 5, at a block 510, the networking device 100 exchanges wireless signals during at least one network connection. The networking device 100 may exchange wireless signals with at least one access point to establish or support the network connection. The networking device 100 may send or receive the wireless signals from a directional or omni-directional antenna.

At a block 520, the networking device 100 preidentifies access points distributed over a predetermined route that are capable of supporting the network connection. The networking device 100 may identify these access points in a route map or a route profile that may be provided to the networking device 100. Optionally, the networking device 100 may identify access points distributed in a geographical region that are capable of supporting the network connection.

At a block 530, the networking device 100 monitors signal strength of wireless signals from at least one of the access points. The signal strength, when combined with other pre-knowledge provided to the networking device 100, may indicate the location of the networking device 100 relative to at least one access point. The networking device 100 may also institute hysteresis timers 128 or switch frequencies or access point responsive, at least in part, to the measured signal strength.

At a block 540, the networking device 100 hands-over the network connection between identified access points as the device travels along the predetermined route or in the geographical region. The hand-over may be made according to the route map, route profile, or other pre-knowledge of the predetermined route or geographical region, in combination with signal strength measurements.

One of skill in the art will recognize that the concepts taught herein can be tailored to a particular application in many other advantageous ways. In particular, those skilled in the art will recognize that the illustrated embodiments are but one of many alternative implementations that will become apparent upon reading this disclosure.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

The invention claimed is:

1. A device comprising:
 a wireless interface to exchange wireless signals with a first access point of multiple access points in at least one network connection; and
 a handover controller to utilize a route profile configured to identify locations of the multiple access points distributed over a route that are capable of supporting the network connection, where the handover controller is configured to monitor signal strength of wireless signals from the multiple access points, and to determine whether to handover the network connection to a second access point of the multiple access points based, at least in part, on the monitored signal strength of the wireless signals from the first and second access points and the route profile as the device travels along the route, and where the handover controller is configured to identify expected signal strength fluctuations proximate to the first access point based on the route profile, and to maintain an association with the first access point as the device passes through the signal strength fluctuations.

2. The device of claim 1 where the route profile includes a route map configured to identify locations of the access points along the predetermined route and characteristics of the access points including a number of packet-switched hops from the access points to a network backbone.

3. The device of claim 2 where the handover controller is configured to handover the network connection between access points based on the route map and the monitored signal strength of the wireless signals from the plurality of the access points.

4. The device of claim 1 where the handover controller is configured to compare the monitored signal strength of the wireless signals to a threshold value, and to determine a proximity of the handover controller to the first access point based on the comparison.

5. The device of claim 4 where the handover controller is configured to invoke a hysteresis timer based on the proximity of the handover controller to the first access point, the hysteresis timer to indicate to the handover controller an availability to handover the network connection to the second access point.

6. The device of claim 1 where the handover controller is configured to determine a location of the device relative to the access points identified in the route profile, and to handover the network connection to between the first and second access points based on the location of the device relative to the access points identified in the route profile.

7. A method comprising:
    utilizing, with a networking device, a route profile to identify access points distributed over a route that are capable of supporting a network connection, and to identify expected signal strength fluctuations proximate to a first access point currently supporting the network connection;
    monitoring, with the networking device, signal strength of wireless signals from the access points;
    determining, with the networking device, whether to handover the network connection to a second access point from the first access point based, at least in part, on the monitored signal strength of the wireless signals from the access points and the route profile; and
    maintaining, with the networking device, an association with the first access point as the networking device passes through the signal strength fluctuations based on the determination.

8. The method of claim 7 includes accessing a route map in the route profile to identify locations of the access points along the route and characteristics of the access points including a number of packet-switched hops from the access points to a network backbone.

9. The method of claim 7 includes:
    comparing, with the networking device, the monitored signal strength of the wireless signals to a threshold value; and
    determining, with the networking device, a proximity of the networking device to the first access point based on the comparison.

10. The method of claim 9 includes invoking a hysteresis timer with the networking device based on the proximity of the networking to the first access point, the hysteresis timer to indicate to the networking device an availability to handover the network connection to the second access point.

11. The method of claim 7 includes
    determining the location of the networking device utilizing the network connection relative to the access points; and
    handing-over the network connection to between the first and second access points based on the location of the networking device relative to the access point.

12. An apparatus comprising:
    means for utilizing a route profile to identify access points distributed over a route that are capable of supporting a network connection, and to identify expected signal strength fluctuations proximate to a first access point currently supporting the network connection;
    means for monitoring signal strength of wireless signals from the access points;
    means for determining whether to handover the network connection to a second access point from the first access point based, at least in part, on the monitored signal strength of the wireless signals from the access points and the route profile as the apparatus travels along the route; and
    means for maintaining an association with the first access point as the apparatus passes through the signal strength fluctuations based on the determination.

13. The apparatus of claim 12 where the means for utilizing the route profile is configured to access a route map in the route profile to identify locations of the access points along the route and characteristics of the access points including a number of packet-switched hops from the access points to a network backbone.

14. The apparatus of claim 12 where the means for determining whether to handover the network connection is configured to compare the monitored signal strength of the wireless signals to a threshold value, and determine a proximity of the networking device to the first access point based on the comparison.

15. The apparatus of claim 14 where the means for determining whether to handover the network connection is configured to invoke the means for maintaining based on the proximity of the apparatus to the first access point.

16. The apparatus of claim 12 where the means for determining whether to handover the network connection is configured to determine the location of the apparatus utilizing the network connection relative to the access points and is configured to handover the network connection to between the first and second access points based on the location of the apparatus relative to the access point.

* * * * *